United States Patent
Teramoto et al.

(10) Patent No.: US 9,523,404 B2
(45) Date of Patent: Dec. 20, 2016

(54) SPRING STEEL AND SPRING (75) Inventors: Shinya Teramoto, Tokyo (JP); Manabu Kubota, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/237,949

(22) PCT Filed: Aug. 15, 2012

(86) PCT No.: PCT/JP2012/070767
§ 371 (c)(1),
(2), (4) Date: Feb. 10, 2014

(87) PCT Pub. No.: WO2013/024876
PCT Pub. Date: Feb. 21, 2013

(65) Prior Publication Data
US 2014/0193288 A1 Jul. 10, 2014

(30) Foreign Application Priority Data
Aug. 18, 2011 (JP) .................................. 2011-178997

(51) Int. Cl.
C22C 38/38 (2006.01)
F16F 1/02 (2006.01)
(Continued)

(52) U.S. Cl.
CPC . F16F 1/02 (2013.01); C21D 1/06 (2013.01); C21D 6/008 (2013.01); C21D 8/065 (2013.01);
(Continued)

(58) Field of Classification Search
CPC .......... C21D 1/06; C21D 6/008; C21D 8/065; C22C 38/001
(Continued)

(56) References Cited

U.S. PATENT DOCUMENTS

| 4,448,617 A | 5/1984 | Yamamoto et al. |
| 4,909,866 A | 3/1990 | Abe et al. |

(Continued)

FOREIGN PATENT DOCUMENTS

| CN | 101365820 | 2/2009 |
| EP | 0943697 A1 | 9/1999 |

(Continued)

OTHER PUBLICATIONS

International Search Report dated Nov. 13, 2012 issued in corresponding PCT Application No. PCT/JP2012/070767 [With English Translation].

(Continued)

*Primary Examiner* — Jie Yang
(74) *Attorney, Agent, or Firm* — Birch, Stewart, Kolasch & Birch, LLP (57) ABSTRACT

The present invention provides a spring steel, which is finally formed into a spring, by making use of, at a maximum, the temper softening resistance effect due to alloying elements while suppressing the formation of hard inclusions of $SiO_2$ and the generation of decarburization, which may cause deterioration of fatigue characteristics of the spring. The spring steel is characterized by comprising, in % by mass, C: 0.50 to 0.70%, Si: 1.00 to 5.00%, Mn: 0.30 to 2.00%, P: 0.0002 to 0.0500%, S: 0.0002 to 0.0500%, Cr: 0.10 to 3.50%, Al: 0.0005 to 0.0500%, and N: 0.0020 to 0.0100%, with the balance being Fe and inevitable impurities, wherein the H-value defined by the following equation (a) is 160 or more, and the C-value defined by the following equation (b) is 3.25 or less:

$$H=33.6[C]+10.0[Si]+5.95[Mn]+11.1[Cr]+90.0 \quad (a),$$

and $$C=[Si]/[Mn] \quad (b).$$

4 Claims, 2 Drawing Sheets (51) Int. Cl.
- *C21D 1/06* (2006.01)
- *C21D 6/00* (2006.01)
- *C21D 9/02* (2006.01)
- *C22C 38/00* (2006.01)
- *C22C 38/04* (2006.01)
- *C22C 38/06* (2006.01)
- *C22C 38/34* (2006.01)
- *C21D 8/06* (2006.01)
- *C22C 38/02* (2006.01)
- *C22C 38/22* (2006.01)
- *C22C 38/24* (2006.01)
- *C22C 38/26* (2006.01)
- *C22C 38/28* (2006.01)

(52) U.S. Cl.
CPC .............. *C21D 9/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/34* (2013.01); *C22C 38/38* (2013.01)

(58) Field of Classification Search
USPC .................................. 148/320, 333; 420/104
See application file for complete search history.

(56) References Cited

U.S. PATENT DOCUMENTS

| | | | | |
|---|---|---|---|---|
| 5,776,267 | A * | 7/1998 | Nanba | C22C 38/44 148/328 |
| 8,038,934 | B2 | 10/2011 | Kochi | |
| 8,734,599 | B2 * | 5/2014 | Choi | C21D 8/06 148/333 |
| 2006/0201588 | A1 | 9/2006 | Suda et al. | |
| 2008/0279714 | A1 * | 11/2008 | Hashimura et al. | 420/118 |
| 2009/0007998 | A1 | 1/2009 | Kochi et al. | |
| 2010/0086432 | A1 | 4/2010 | Sugimura | |
| 2010/0224287 | A1 | 9/2010 | Kochi et al. | |

FOREIGN PATENT DOCUMENTS

| | | |
|---|---|---|
| EP | 1801255 A1 | 6/2007 |
| EP | 2022867 A1 | 2/2009 |
| EP | 2058411 A1 | 5/2009 |
| EP | 2163657 A1 | 3/2010 |
| JP | 57-32353 | 2/1982 |
| JP | 61-136612 | 6/1986 |
| JP | 62-177152 | 8/1987 |
| JP | 64-83644 | 3/1989 |
| JP | 02-057637 | 2/1990 |
| JP | 2003-268483 | 9/2003 |
| JP | 2004-315968 | 11/2004 |
| JP | 2007-169688 | 7/2007 |
| JP | 2007-231347 | 9/2007 |
| JP | 2007-302950 | 11/2007 |
| JP | 2009-024245 | 2/2009 |
| KR | 10-2008-0080210 | 9/2008 |
| KR | 20090130416 | 12/2009 |
| KR | 20110075317 A | 7/2011 |
| KR | 20110075318 A | 7/2011 |
| SU | 985128 A1 | 12/1982 |
| WO | 2012/005373 | 1/2012 |

OTHER PUBLICATIONS

European Search Report for application EP Application No. 12824592.5, mailed on May 4, 2015.

* cited by examiner

SPRING STEEL AND SPRING

This application is a national stage application of International Application No. PCT/JP2012/070767, filed Aug. 15, 2012, which claims priority to Japanese Application No. 2011-178997, filed Aug. 18, 2011, each of which is incorporated by reference in its entirety.

TECHNICAL FIELD

The present invention relates to a spring steel used for valve springs, clutch springs, and suspension springs employed in automobiles and, particularly, to a high strength spring steel and a spring, which suppress softening due to a heat treatment, such as a quenching and tempering treatment or a nitriding treatment, after wire drawing or coiling, and also suppress the formation of hard inclusions of $SiO_2$ and the generation of decarburization, which may cause deterioration of fatigue characteristics of the spring.

BACKGROUND ART

Due to trends toward weight reduction and higher performance of automobiles, springs have been strengthened and high strength steels having a tensile strength of more than 1,600 MPa after a heat treatment have been applied to springs. In recent years, steels having a tensile strength of more than 1,900 MPa have also been used.

Methods for producing a coil spring using a steel include a hot coiling process comprising heating the steel to the austenite region for coiling, and then quenching and tempering the steel; and a cold coiling process comprising cold coiling a high strength steel wire made of the steel quenched and tempered in advance. In both cases, the fundamental strength of the spring is determined by quenching and tempering. Therefore, composition design considering characteristics after quenching and tempering is important for a spring steel.

For example, like Patent Documents 1 to 3, for the purpose of strengthening, a large amount of C is basically added and also alloying elements such as V and Mo are added to thereby improve hardenability and temper softening resistance.

Like Patent Document 4, surface hardening due to a nitriding treatment is effective so as to further strengthen a spring. Usually, the nitriding treatment is applied after coiling of the spring. Since this treatment is performed by heating at 400 to 600° C., a surface of the spring is hardened, while a core portion is softened and spring performances such as fatigue characteristics may conversely deteriorate if the core portion does not have a sufficient softening resistance. Therefore, alloying elements capable of imparting temper softening resistance are commonly added.

However, even if alloying elements capable of imparting temper softening resistance are added, the fatigue strength is not increased by enhancing temper softening resistance so as to increase the strength if hard inclusions such as $SiO_2$ exist in the steel, or a decarburized layer exists on a surface layer.

For example, in Patent Document 5, a slag composition in a molten steel treatment is controlled in an appropriate range to thereby enhance ductility of inclusions which may cause a decrease in fatigue strength, and also inclusions are refined by hot rolling to thereby increase the fatigue strength.

For example, in Patent Document 6, heating conditions before hot rolling and cooling conditions after rolling are appropriately controlled, and scales on a surface are removed before hot rolling to thereby suppress the formation of a decarburized layer. It has recently been required for springs used in automobiles to have more increased strength. The fact is, however, that conventional steels for high strength spring cannot satisfy such requirements.

In addition, Patent Document 7 describes a hot rolled wire rod usable as a raw material of drawn wire products such as a spring steel, which is excellent in wire drawability and also can suppress wire breakage even in the case of heavy drawing from a thick wire rod. Patent Document 8 discloses a steel wire for cold formed spring, which is excellent in cold cuttability and fatigue characteristics.

PRIOR ART DOCUMENTS

Patent Documents

Patent Document 1: JP 57-32353 A
Patent Document 2: JP 1-83644 A
Patent Document 3: JP 2-57637 A
Patent Document 4: JP 2004-315968 A
Patent Document 5: JP 61-136612 A
Patent Document 6: JP 2003-268483 A
Patent Document 7: JP 2007-231347 A
Patent Document 8: JP 2007-169688 A

DISCLOSURE OF THE INVENTION

Problems to be Solved by the Invention

Regarding spring steels, many patent documents already exist and these patent documents describe a very broad range of steel compositions. However, there has never been known a steel with all requisites for suppression of the formation of hard inclusions of $SiO_2$ and the generation of decarburization, which may cause deterioration of fatigue characteristics of the spring, and suppression of softening of a spring core portion due to a tempering or nitriding treatment.

An object of the present invention is to provide a high strength spring steel, which is finally formed into a high strength spring, by making use of, at a maximum, the temper softening resistance effect due to alloying elements to thereby increase the strength of a spring core portion while suppressing the formation of hard inclusions of $SiO_2$ and the generation of decarburization, which may cause deterioration of fatigue characteristics of the spring.

It is also an object of the present invention to provide a high strength spring which is produced by using the spring steel of the present invention.

Means for Solving the Problems

The present inventors have studied a component composition which is excellent in temper softening resistance while suppressing the formation of $SiO_2$ inclusions formed during the spring production process, and the generation of decarburization, and thus created an optimum component composition of a high strength spring steel to obtain the following findings (A) to (E).

(A) Hardness after a tempering or nitriding treatment is important as characteristics of a steel for high strength spring. Particularly, although the nitriding treatment is a heat treatment which is effective to improve the hardness of a surface, a core portion is tempered at high temperature over a long period of time during the nitriding treatment and thus undergoes drastic softening. The inventors have introduced the following indicator H so as to quantitatively evaluate a relation between tempering hardness of the core portion of the steel after the nitriding treatment and the component composition of the steel to thereby find an effective amount of temper softening resistance in each element:

$$H=33.6[C]+10.0[Si]+5.95[Mn]+11.1[Cr]+21.9[Mo]+34.0[V]+90.0,$$

wherein [C], [Si], [Mn], [Cr], [Mo], and [V] represent the contents (% by mass) of the respective elements in the steel.

(B) It has been found that, in particular, the addition of Si and Cr in a large amount of more than 3.0% imparts significant temper softening resistance.

(C) However, the addition of a large amount of Si causes the formation of a large amount of hard inclusions $SiO_2$, thus failing to refine inclusions by hot rolling. Therefore, since a spring is obtained while remaining coarse inclusions in the steel, the steel undergoes fatigue fracture at these inclusions as starting points, leading to drastic deterioration of fatigue characteristics. However, it has been found that, even if Si is added in an amount more than that of Si contained in a conventional spring steel, it is possible to maintain fatigue characteristics by suppressing the formation of $SiO_2$ through adjustment of an amount of Mn which forms oxides, like Si. In order to suppress fatigue fracture at hard inclusion of $SiO_2$ as starting points, the C-value defined by the following equation (b) is adjusted to 3.25 or less:

$$C=[Si]/[Mn] \qquad (b)$$

wherein [Si] and [Mn] represent the contents (% by mass) of the respective elements in the steel.

(D) Not only the increased amount of $SiO_2$ formed but also a large amount of Si added causes drastic decarburization to occur on a surface layer, leading to drastic deterioration of fatigue characteristics. The amount of decarburization is also significantly influenced by the heating temperature and, therefore, when a large amount of Si is added, the heating temperature is preferably low so as to suppress decarburization. In a steel material having V or Mo added, which forms alloy carbide, the heating temperature becomes higher than that of a V or Mo-free steel material so as to sufficiently obtain the effect of temper softening resistance due to V and Mo, resulting in increased amount of decarburization. Accordingly, in the steel material containing a large amount of Si, when a comparison is made between fatigue characteristics of steel materials having the same tempering hardness, the steel material having V or Mo added is excellent in fatigue characteristics as compared with the V or Mo-free steel material, due to an influence of the amount of decarburization. In the case of the V or Mo-free steel material, in order to obtain the fatigue strength of 800 MPa or more, the tempering hardness is adjusted to 550 or more in terms of Vickers hardness, and to do so, the H-value defined by the following equation (a) is adjusted to 160 or more. In the case of the steel material having V or Mo added, in order to obtain a fatigue strength of the same level or more, a Vickers hardness is adjusted to 605 or more, and to do so, the H-value defined by the following equation (c) is adjusted to 173 or more:

$$H=33.6[C]+10.0[Si]+5.95[Mn]+11.1[Cr]+90.0 \qquad (a),$$

and $$H=33.6[C]+10.0[Si]+5.95[Mn]+11.1[Cr]+21.9[Mo]+34.0[V]+90.0 \qquad (c)$$

wherein [C], [Si], [Mn], [Cr], [Mo], and [V] represent the contents (% by mass) of the respective elements in the steel.

(E) When a large amount of Cr is added, it is necessary to make the heating temperature higher so as to sufficiently solutionize Fe-based carbides in order to stabilize the carbides. When Cr is added in a large amount of more than 3.5%, drastic decarburization occurs on a surface layer, leading to drastic deterioration of fatigue characteristics.

The present invention has been completed based on the above findings, and the gists thereof are as follow.

(1) A spring steel characterized by including, in % by mass:
C: 0.50 to 0.70%,
Si: 1.00 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities, wherein the H-value defined by the following equation (a) is 160 or more, and the C-value defined by the following equation (b) is 3.25 or less:

$$H=33.6[C]+10.0[Si]+5.95[Mn]+11.1[Cr]+90.0 \qquad (a),$$

and $$C=[Si]/[Mn] \qquad (b),$$

wherein [C], [Si], [Mn], and [Cr] represent the contents (% by mass) of the respective elements in the steel.

(2) The spring steel according to the above (1), characterized by further including, in % by mass, one or more of:
Mo: 0.01 to 1.00%, and
V: 0.01 to 0.30%,
wherein the H-value defined by the following equation (c) in place of the formula (a) is 173 or more:

$$H=33.6[C]+10.0[Si]+5.95[Mn]+11.1[Cr]+21.9[Mo]+34.0[V]+90.0 \qquad (c),$$

wherein [C], [Si], [Mn], [Cr], [Mo], and [V] represent the contents (% by mass) of the respective elements in the steel.

(3) The spring steel according to the above (1) or (2), characterized by further including, in % by mass:
Nb: 0.001 to 0.200%.

(4) The spring steel according to any one of the above (1) to (3), characterized by further including, in % by mass, one or more of:
Ca: 0.0002 to 0.0100%,
Mg: 0.0002 to 0.0100%, and
Zr: 0.0005 to 0.1000%.

(5) A spring produced by subjecting a steel material to a heat treatment, such as a quenching and tempering treatment or a nitriding treatment, after wire drawing, characterized in that the steel material includes, in % by mass:
C: 0.50 to 0.70%,
Si: 1.00 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities, wherein the spring has an H-value defined by the following equation (a) of 160 or more, and a C-value defined by the following equation (b) of 3.25 or less:

$$H=33.6[C]+10.0[Si]+5.95[Mn]+11.1[Cr]+90.0 \qquad (a),$$

and $$C=[Si]/[Mn] \qquad (b),$$

wherein [C], [Si], [Mn], and [Cr] represent the contents (% by mass) of the respective elements in the steel.

(6) The spring according to the above (5), characterized in that the steel material further includes, in % by mass, one or more of:
Mo: 0.01 to 1.00%, and
V: 0.01 to 0.30%,
wherein an H-value defined by the following equation (c) in place of the equation (a) is 173 or more:

$$H=33.6[C]+10.0[Si]+5.95[Mn]+11.1[Cr]+21.9[Mo]+34.0[V]+90.0 \qquad (c)$$

wherein [C], [Si], [Mn], [Cr], [Mo], and [V] represent the contents (% by mass) of the respective elements in the steel.

(7) The spring according to the above (5) or (6), characterized in that the steel material further includes, in % by mass:
Nb: 0.001 to 0.200%.

(8) The spring according to any one of the above (5) to (7), characterized in that the steel material further includes, in % by mass, one or more of:
Ca: 0.0002 to 0.0100%,
Mg: 0.0002 to 0.0100%, and
Zr: 0.0005 to 0.1000%.

According to the present invention, there is also provided a method for evaluating a fatigue strength of a spring, using the above H-value and C-value. The gists of the method for evaluating the fatigue strength of a spring are as follows.

(a) A method for evaluating the fatigue strength of a spring, characterized by evaluating the fatigue strength of a spring produced by subjecting a steel material including, in % by mass:
C: 0.50 to 0.70%,
Si: 1.00 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities, to a heat treatment, such as a quenching and tempering treatment or a nitriding treatment, after wire drawing, by use of an H-value defined by the following equation (a) and a C-value defined by the following equation (b):

$$H=33.6[C]+10.0[Si]+5.95[Mn]+11.1[Cr]+90.0 \qquad (a),$$

and $$C=[Si]/[Mn] \qquad (b),$$

wherein [C], [Si], [Mn], and [Cr] represent the contents (% by mass) of the respective elements in the steel.

(b) The method for evaluating the fatigue strength of a spring according to the above (a), characterized in that the steel material further includes, in % by mass, one or more of:
Mo: 0.01 to 1.00%, and
V: 0.01 to 0.30%,
wherein the H-value defined by the following equation (c) in place of the formula (a) is 173 or more:

$$H=33.6[C]+10.0[Si]+5.95[Mn]+11.1[Cr]+21.9[Mo]+34.0[V]+90.0 \qquad (c)$$

wherein [C], [Si], [Mn], [Cr], [Mo], and [V] represent the contents (% by mass) of the respective elements in the steel.

(c) The method for evaluating the fatigue strength of a spring according to the above (a) or (b), characterized in that the steel material further includes, in % by mass:
Nb: 0.001 to 0.200%.

(d) The method for evaluating the fatigue strength of a spring according to any one of the above (a) to (c), characterized in that the steel material further includes, in % by mass, one or more of:
Ca: 0.0002 to 0.0100%,
Mg: 0.0002 to 0.0100%, and
Zr: 0.0005 to 0.1000%.

According to the present invention, there is also provided a method for producing a high strength spring, which satisfies definitions based on the above H-value and C-value. The gists of the method for producing a high strength spring are as follows.

(e) A method for producing a high strength spring, characterized by subjecting a steel material including, in % by mass:
C: 0.50 to 0.70%,
Si: 1.00 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities, to a heat treatment, such as a quenching and tempering treatment or a nitriding treatment, after wire drawing to produce a spring, to thereby adjust the following H-value defined by the following equation (b) to 160 or more, and the C-value defined by the following equation (b) to 3.25 or less:

$$H=33.6[C]+10.0[Si]+5.95[Mn]+11.1[Cr]+90.0 \qquad (a),$$

and $$C=[Si]/[Mn] \qquad (b),$$

wherein [C], [Si], [Mn], and [Cr] represent the contents (% by mass) of the respective elements in the steel.

(f) The method for producing a high strength spring according to the above (e), characterized in that the steel material further includes, in % by mass, one or more of:
Mo: 0.01 to 1.00%, and
V: 0.01 to 0.30%,
and wherein the H-value defined by the following equation (c) in place of the formula (a) is 173 or more:

$$H=33.6[C]+10.0[Si]+5.95[Mn]+11.1[Cr]+21.9[Mo]+34.0[V]+90.0 \qquad (c)$$

wherein [C], [Si], [Mn], [Cr], [Mo], and [V] represent the contents (% by mass) of the respective elements in the steel.

(g) The method for producing a high strength spring according to the above (e) or (f), characterized in that the steel material further includes, in % by mass:
Nb: 0.001 to 0.200%.

(h) The method for producing a high strength spring according to any one of the above (e) to (g), characterized in that the steel material further includes, in % by mass, one or more of:

Ca: 0.0002 to 0.0100%,
Mg: 0.0002 to 0.0100%, and
Zr: 0.0005 to 0.1000%.

Effects of the Invention

The steel of the present invention enables the production of a high strength spring by reducing elements capable of lowering the spring strength and also making use of, at a maximum, the temper softening resistance effect due to alloying elements, and therefore exerts industrially remarkable high effects.

MODE FOR CARRYING OUT THE INVENTION

The present invention will be described in detail below.

First, the above equations (a) and (c) defined in the present invention will be described.

Among characteristics of a steel for high strength spring, a hardness after a tempering or nitriding treatment is important. Particularly, the nitriding treatment is a heat treatment which is effective to improve the hardness of a surface, while a core portion is tempered at a high temperature over a long period of time during the nitriding treatment and thus undergoes drastic softening. The inventors have experimentally introduced the following indicators H so as to quantitatively evaluate a relation between tempering hardness of the core portion of the steel after the nitriding treatment and the component composition of the steel:

In the case of a steel free from Mo and V:

Indicator H=33.6[C]+10.0[Si]+5.95[Mn]+11.1[Cr]+90.0     (a), and in the case of a steel containing Mo and/or V:

Indicator H=33.6[C]+10.0[Si]+5.95[Mn]+11.1[Cr]+21.9[Mo]+34.0[V]+90.0     (c).

The indicator H is an indicator for additively evaluating the degree of an influence of [C], [Si], [Mn], [Cr], [Mo], and [V] on the tempering hardness of a core portion of the steel after a nitriding treatment by weighing the degree of an influence of each element. C, Si, Mn, Cr, Mo, and V are main temper softening resistance-improving elements.

Using, as the subjects of the test, various steel materials including C in an amount of 0.50 to 0.70% (in % by mass, the same shall apply hereinafter), Si in an amount of 1.00 to 5.00%, Mn in an amount of 0.20 to 2.00%, P in an amount of 0.001 to 0.0500%, S in an amount of 0.001 to 0.0500%, Cr in an amount of 0.10 to 4.00%, Al in an amount of 0.001 to 0.010%, N in an amount of 0.0030 to 0.0060%, Mo in an amount of 0.01 to 1.00%, and V in an amount of 0.01 to 0.30%, with the balance being Fe and inevitable impurities, the steel materials satisfying the above equation (b), each steel material was subjected to a heat treatment in which the tempering hardness of the core portion after the nitriding treatment had been reproduced. A specimen was heated to a temperature at which alloy carbides or Fe-based carbides can be solutionized, quenched in oil at 60° C., and then subjected to a tempering treatment at 450° C. for 120 minutes. Subsequently, the specimen was cut in a cross section of a diameter direction and embedded in a resin and, after polishing a surface layer, Vickers hardness (HV) was measured. The results are shown in FIG. 1.

Figure 1:
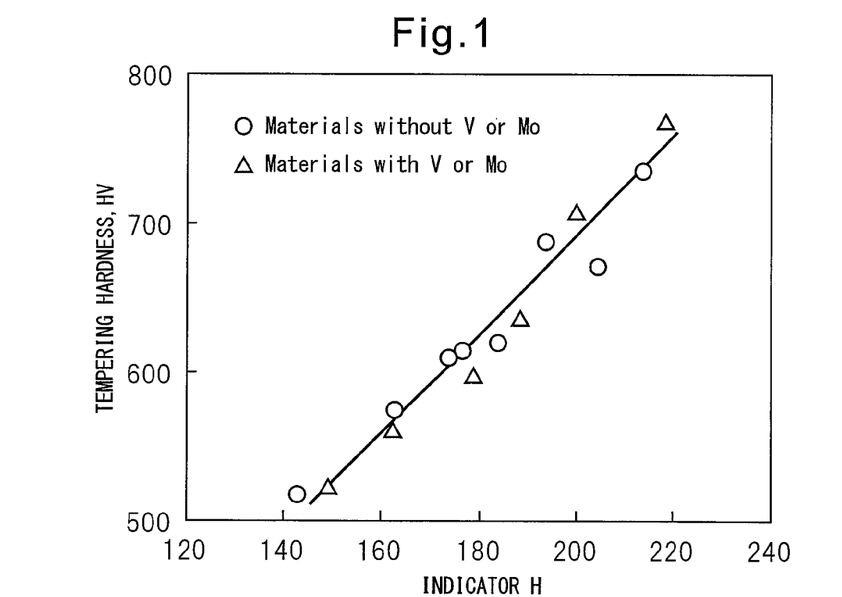
FIG. 1 shows a relation between the indicator H (=33.6[C]+10.0[Si]+5.95[Mn]+11.1[Cr]+90.0) of a V and Mo-free steel material and the indicator H (=33.6[C]+10.0[Si]+5.95[Mn]+11.1[Cr]+21.9[Mo]+34.0[V]+90.0) of a material having V or Mo added, and the tempering hardnesses.

As is apparent from FIG. 1, there is an extremely satisfactory correlation between the indicator H and the tempering hardness of the core portion after the nitriding treatment.

Figure 2:
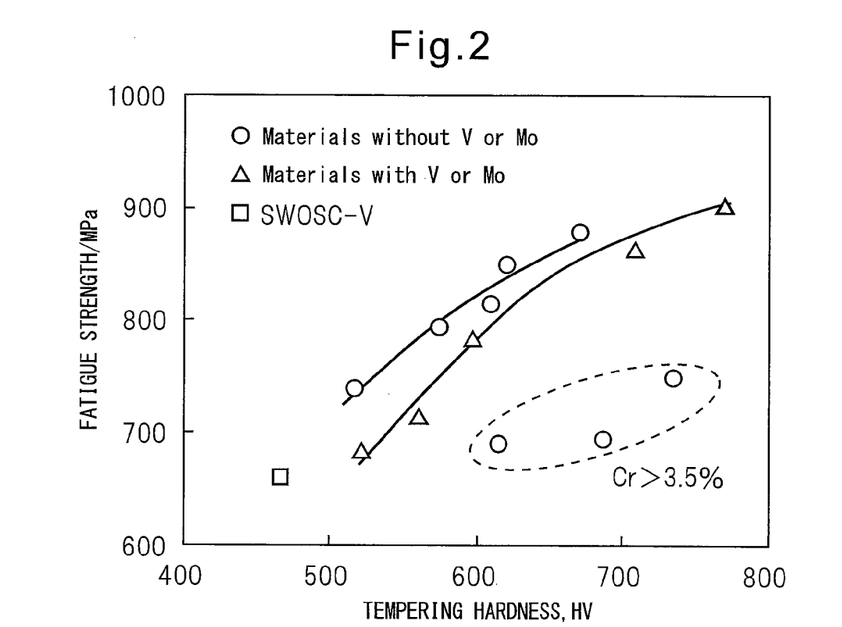
FIG. 2 shows a relation between the tempering hardness (HV) and the fatigue strength (MPa).

Next, a relation between the tempering hardness and the fatigue characteristics was evaluated. The fatigue test used was a Nakamura-type rotating-bending fatigue test. A specimen was subjected to the test after scales at a surface layer due to heat treatment were removed. As a result, a maximum load stress, at which 10 samples exhibited the number of load cycles of not smaller than $10^7$ with a probability of 50% or more, was regarded as the fatigue strength. The results are shown in FIG. 2. The fatigue strength of a steel material SWOSC-V (JIS) often used for springs was also determined, and shown in the drawing. Since the fatigue strength of SWOSC-V is 660 MPa, target fatigue strength was set at 800 MPa or more which has been increased by about 20% therefrom.

As is apparent from FIG. 2, it is necessary to secure a tempering hardness of 550 HV or more for a steel containing neither Mo nor V, while it is necessary to secure a tempering hardness of 650 HV or more for a steel containing Mo or V, so that a fatigue strength of 800 MPa or more is secured. As is apparent from FIG. 1, it is necessary to maintain the indicator H at 160 or more so as to secure a tempering hardness of 550 HV or more, while it is necessary to maintain the indicator H at 173 or more so as to secure a tempering hardness of HV 605 or more. Accordingly, the indicator H was defined to be 160 or more for a steel containing neither Mo nor V, while the indicator H was defined to be 173 or more for a steel containing Mo and/or V. The indicator H is preferably 163 or more, and more preferably 165 or more, for a steel containing no V, while it is preferably 175 or more, and more preferably 177 or more, for a steel containing Mo and V.

The above equation (b) will now be described.

As is apparent from the above equations (a) and (c), Si is an element which significantly contributes to temper softening resistance, and a large amount of Si is added to steel materials for springs to thereby increase the strengths of the springs. However, hard inclusion $SiO_2$ formed in a large amount in the steel provides starting points of fatigue fracture to thereby cause deterioration of fatigue characteristics. It depends on a balance of amounts of easily oxidizable elements added whether or not $SiO_2$ is formed in a large amount. The present inventors have studied a relation between the ratio of an amount of Si to that of Mn and the fatigue characteristics.

Figure 3:
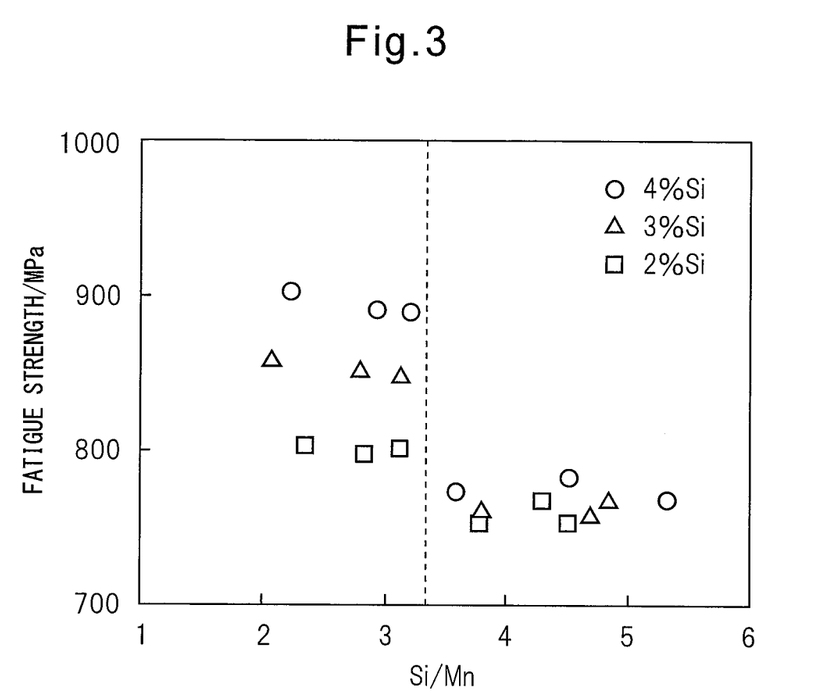
FIG. 3 shows a relation between the indicator C (=[Si]/[Mn]) and the fatigue strength (MPa).

Using, as the subjects of the test, various steel materials including C in an amount of 0.60% (in % by mass, the same shall apply hereinafter), Si in an amount of 2.0 to 4.0%, Mn in an amount of 0.40 to 1.40%, P in an amount of 0.005 to 0.050%, S in an amount of 0.001 to 0.050%, Cr in an amount of 2.5%, Al in an amount of 0.001 to 0.010%, and N in an amount of 0.0030 to 0.0050%, with the balance being Fe and inevitable impurities, the steel material satisfying the above equation (a), each steel material was subjected to a heat treatment in which the tempering hardness of the core portion after the nitriding treatment had been reproduced. A specimen was heated to a temperature at which alloy carbides or Fe-based carbides can be solutionized, quenched in oil at 60° C., and then subjected to a tempering treatment at 450° C. for 120 minutes. In order to eliminate an influence of decarburization, a region of 0.5 mm from the surface was ground off. A Nakamura-type rotating-bending fatigue test was used for evaluation of fatigue characteristics. The results are shown in FIG. 3.

As is apparent from FIG. 3, the fatigue strengths are 800 MPa or more when a ratio of an amount of Si to that of Mn (hereinafter referred to as [Si]/[Mn]) is 3.25 or less, while the fatigue strengths are low and 800 MPa or less when [Si]/[Mn] is more than 3.25. Starting points of fatigue fracture of these low fatigue strength materials were observed and, as a result, hard inclusions composed mainly of $SiO_2$ served as starting points. Thus, it is considered that a decrease in fatigue strength is mainly caused by $SiO_2$. Accordingly, a ratio [Si]/[Mn] of the indicator C was defined to be 3.25 or less. As is apparent from FIG. 3, when the content of Si is constant, although the fatigue strength will not so much change at [Si]/[Mn] of 3.25 or less, there can be seen a tendency that, in particular when the content of Si increases, the fatigue strength increases as [Si]/[Mn] decreases. Therefore, the ratio [Si]/[Mn] is preferably 3.00 or less, and more preferably 2.80 or less.

As mentioned above, the steel of the present invention has excellent characteristics as a high strength spring steel, by defining the component composition using the equation (a) or (c) and the equation (b).

The reasons for restricting the contents of respective elements in the steel of the present invention will now be described. Percentages of components are denoted by mass.

C: 0.50 to 0.70%

C is an important element which governs the strength of a steel. In order to obtain sufficient strength, the lower limit thereof is to be 0.50%. As compared with other alloying elements, alloying cost is inexpensive and it is possible to reduce alloying cost of a steel material if a large amount of C can be added. However, since hot ductility drastically deteriorates when a large amount of C is added, the upper limit thereof is to be 0.70%. It is preferably 0.67% or less, and more preferably 0.65% or less.

Si: 1.00 to 5.00%

Si is an element required to secure the strength and hardness of a spring, and the lower limit thereof is to be 1.00% so as to obtain sufficient strength. Furthermore, Si is an important element which significantly contributes to temper softening resistance, and the addition of Si leads to strengthening of the spring. Therefore, the lower limit of Si is preferably 2.50%, more preferably 2.70%, and most preferably 3.00%. On the other hand, when a large amount of Si is added, not only the strength of the steel increases, but also significant embrittlement thereof occurs. Therefore, the upper limit is to be 5.00%.

Mn: 0.30 to 2.00%

Mn is very often used since it fixes S in the steel as MnS and enhances hardenability to obtain an enough hardness after a heat treatment. Furthermore, in the present invention, it is an important element which governs whether or not $SiO_2$ is formed. Even in the case of adding a large amount of Si, use of appropriate amounts of Si and Mn in the steel enables prevention of deterioration of fatigue characteristics. In order to obtain such effects, the content of Mn is adjusted to 0.30% or more. On the other hand, when Mn is added in an amount of more than 2.00%, the hardness of the base material increases, leading to embrittlement. Therefore, the upper limit is to be 2.00%.

P: 0.0002 to 0.0500%

Since P is usually contained in a steel as an inevitable impurity in an amount of 0.0002% or more, the lower limit thereof is to be 0.0002%. Even if P is added, P segregates at prior austenite grain boundaries to cause drastic embrittlement, and therefore, the upper limit thereof is to be 0.0500%. It is preferably 0.0300% or less, more preferably 0.0200% or less, and still more preferably 0.0150% or less.

S: 0.0002 to 0.0500%

Like P, S is usually contained in a steel as an inevitable impurity in an amount of 0.0002% or more, and embrittles the steel when it exists in the steel. In the case of S, although influences thereof are reduced as small as possible by Mn, MnS is in the form of an inclusion, leading to deterioration of fatigue characteristics. Particularly, in a high strength steel, fracture may occur from a trace amount of MnS and the content of S is desirably reduced as much as possible. Therefore, the upper limit thereof is to be 0.0500%. Accordingly, the content of S is adjusted in a range from 0.0002 to 0.0500%. The upper limit is preferably 0.0300%, more preferably 0.0200%, and still more preferably 0.0150%.

Cr: 0.10 to 3.50%

Cr is an important element which significantly contributes to temper softening resistance, and the addition thereof leads to strengthening of a spring. In order to obtain this effect, the amount of Cr added is to be 0.10% or more. However, Cr is solid-soluted in Fe-based carbides to thereby stabilize them. Accordingly, in order to obtain the effect of temper softening resistance, a heating temperature must be drastically raised. In this case, when Cr is added in an amount of more than 3.50%, drastic decarburization occurs, leading to a decrease in fatigue strength. Therefore, the upper limit of an amount of Cr is to be 3.50%.

Al: 0.0005 to 0.0500%

Since Al is usually contained in a steel as an inevitable impurity in an amount of 0.0005% or more, the lower limit thereof is to be 0.0005%. Even if Al is added, Al forms oxides such as $Al_2O_3$, which provide starting points of fatigue fracture to thereby cause deterioration of fatigue characteristics of a spring. Therefore, the upper limit thereof is to be 0.0500% but is desirably reduced as much as possible. Preferably, it is 0.0100% or less.

N: 0.0020 to 0.0100%

N is combined with various alloying elements, such as V and Nb, to form nitrides to thereby suppress austenite grain growth, and exerts an influence on properties of a steel and a spring. In order to obtain these effects, the lower limit of the content of N is to be 0.0020%. On the other hand, when the content of N increases, hot ductility of the steel drastically deteriorate to cause a problem of generation of marks during hot rolling of a raw steel bar. Therefore, the upper limit is to be 0.0100%.

At least one of Mo: 0.01 to 1.00% and V: 0.01 to 0.30%

Mo and V are important elements which significantly contribute to temper softening resistance, and the addition of at least one of them leads to strengthening of a spring. In order to obtain this effect, the amount of each element added must be 0.01% or more. On the other hand, when a large amount is added, a heating temperature must be raised so as to obtain the effect of temper softening resistance, and the amount of decarburization generated as the heating temperature increases, leading to a decrease in fatigue strength.

Accordingly, the upper limit of Mo is to be 1.00% and the upper limit of V is to be 0.30%. V is combined with N to form a nitride, which contributes, as pinning particles, to the refinement of austenite grain.

Nb: 0.001 to 0.200%

Like V, Nb is combined with N to form nitrides, which contributes, as pinning particles, to the refinement of austenite grain. In order to obtain this effect, the amount of Nb added is to be 0.001% or more. On the other hand, when the amount is more than 0.200%, not only the effect is saturated, but also hot ductility of the steel drastically deteriorates to cause a problem of generation of marks during hot rolling of a raw steel bar. Therefore, the upper limit is to be 0.200%.

One or more of Ca: 0.0002 to 0.0100%, Mg: 0.0002 to 0.0100%, and Zr: 0.0005 to 0.1000%

Ca, Mg, and Zr form oxides, which serve as crystallization nuclei for Mn sulfide and have an effect on uniform fine dispersion of the Mn sulfide. In order to exhibit this effect, the lower limits of Ca and Mg are to be 0.0002%, and the lower limit of Zr is to be 0.0005%. On the other hand, when the amounts of Ca and Mg are more than 0.0100%, and the amount of Zr is more than 0.1000%, hard inclusions such as oxides and sulfides thereof are formed in large amounts, leading to deterioration of fatigue characteristics of the steel. Accordingly, the upper limits of Ca and Mg are to be 0.0100%, while the upper limit of Zr is to be 0.1000%.

A significant feature in the spring steel of the present invention is that the content of Si is higher than that of a conventional spring steel. Si is an important element which is required to secure the strength of a spring and significantly contributes to temper softening resistance of the steel, leading to strengthening of the spring. However, it was previously not easy to realize a spring steel having a large amount of Si added of, for example, more than 2.5%. This is because hard inclusion $SiO_2$ exists in the steel. Fatigue characteristics have hitherto been improved by controlling the slag composition in a molten steel treatment in an appropriate range to thereby form inclusions having high ductility rather than hard inclusions such as $SiO_2$, and refining the formed inclusions by hot rolling. Since an increase in an amount of Si contained in the steel leads to a rise in crystallization temperature of $SiO_2$, there was a need to make the heating temperature before rolling higher than the crystallization temperature so as to suppress the formation of $SiO_2$. However, the increase in heating temperature before rolling causes drastic deterioration of hot ductility, and thus the upper limit of the amount of Si was hitherto 2.5% so as to attain the heating temperature which enables production while suppressing the formation of $SiO_2$.

In the present invention, as the result of the finding that the adjustment of a ratio of the contents of Si and Mn, which are liable to form oxides, enables control of the crystallization temperature of $SiO_2$, the C-value defined by [Si]/[Mn] is adjusted to 3.25 or less, based on the knowledge described previously, so as to suppress the occurrence of fatigue fracture at the hard inclusion $SiO_2$ serving as starting points thereof. In the present invention, as the result of the adjustment of the C-value, it is possible to realize a spring steel with a high Si content. In the spring steel with a high Si content, a rise in heating temperature leads to an increase in the amount of decarburization, resulting in deterioration of fatigue characteristics. In particular, for V and Mo contained in a spring steel, there is a need to raise the heating temperature depending on the amounts thereof so as to exhibit the effect of temper softening resistance. Therefore, it has been found that no addition of V and Mo, or a decrease in the amounts thereof contributes to realization of a spring steel with a high Si content. Based on the synergistic effect of the combination of these, the present invention provides a high strength spring steel, which will be finally formed into a high strength spring, by making use of, at a maximum, the temper softening resistance effect due to alloying elements while suppressing the formation of hard inclusion of $SiO_2$ that causes deterioration of fatigue characteristics of the spring to thereby increase the strength of the spring core portion, regardless of its higher Si content than that of a conventional spring steel.

According to the present invention, there is also provided a spring produced using the spring steel of the invention.

The spring of the invention is produced by subjecting a steel material with the composition defined in the invention, namely, a steel material including, in % by mass:

C: 0.50 to 0.70%,
Si: 1.00 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%, with the balance being Fe and inevitable impurities, to a heat treatment, such as a quenching and tempering treatment or a nitriding treatment, after wire drawing. The spring of the invention is characterized in that the H-value defined by the following equation (a) is 160 or more, and the C-value defined by the following equation (b) is 3.25 or less:

$$H=33.6[C]+10.0[Si]+5.95[Mn]+11.1[Cr]+90.0 \quad (a),$$

and $$C=[Si]/[Mn] \quad (b),$$

wherein [C], [Si], [Mn], and [Cr] represent the contents (% by mass) of the respective elements in the steel.

The steel material can further include, in % by mass, one or more of:

Mo: 0.01 to 1.00%, and
V: 0.01 to 0.30%.

The spring obtained using this steel material is characterized in that the H-value defined by the following equation (c) in place of the above formula (a) is 173 or more:

$$H=33.6[C]+10.0[Si]+5.95[Mn]+11.1[Cr]+21.9[Mo]+34.0[V]+90.0 \quad (c),$$

wherein [C], [Si], [Mn], [Cr], [Mo], and [V] represent the contents (% by mass) of the respective elements in the steel.

The steel material may further include, in % by mass:
Nb: 0.001 to 0.200%.

The steel material can further include, in % by mass, one or more of:

Ca: 0.0002 to 0.0100%,
Mg: 0.0002 to 0.0100%, and
Zr: 0.0005 to 0.1000%.

The invention will now be described in detail below by way of Examples. These Examples are used for the purpose of describing technical meanings and effects of the invention rather than limiting the scope of the invention.

EXAMPLES

Steels composed of chemical components shown in Table 1 were melted in a vacuum melting furnace and then hot-rolled to obtain 6 mm diameter steel wire rods. The composition of the steel of the Conventional Example corresponded to the composition of Si—Cr steel SWOSC-V for valve spring of JIS G 3561. The steel wire rods were subjected to a heat treatment in which the tempering hardness of the core portion after the nitriding treatment was reproduced. Specifically, the steel wire rods were heated, depending on their steel compositions, to a temperature at which alloy carbides or Fe-based carbides can be solutionized, selected from 850 to 1,150° C. as shown in Table 2, quenched in oil at 60° C., and then subjected to a tempering treatment at 450° C. for 120 minutes.

In order to measure the tempering hardnesses of the heat-treated materials, a cross section of a diameter direction was cut from each specimen and, after polishing the cross section, Vickers hardness (300 gf) was measured at the position of 2 mm away from the surface layer. The total decarburized depth was measured by the method using a microscope defined in JIS G 0558. The total decarburized depth of 0 (zero) means that total decarburization could not be confirmed by the microscope.

The fatigue test used was a Nakamura-type rotating-bending fatigue test. A specimen was subjected to the test after scales at a surface layer due to the heat treatment were removed. A maximum load stress, at which 10 samples exhibited the number of load cycles of not smaller than $10^7$ with a probability of 50% or more, was regarded as the fatigue strength.

In Examples Nos. 1 to 11 of the present invention, wherein the steel compositions are within the defined range and both the indicators H and indicators C are also within the defined ranges, the specimens excel in fatigue characteristics and have fatigue strength of 800 MPa or more.

On the other hand, in Comparative Example No. 12, although both the indicators H and C are in the defined ranges, drastic decarburization occurred because of the high content of Cr, leading to the low fatigue strength. In Comparative Example No. 13, although both the indicators H and C are also in the defined ranges, the content of Al is high and the fatigue strength is low. Observation of the fractured specimens among samples subjected to the fatigue test for the starting points of fatigue fracture revealed inclusions composed mainly of $Al_2O_3$ in all specimens. In Comparative Examples Nos. 14 and No. 15, although the steel compositions are in the defined ranges, the fatigue strengths are low and 800 MPa or less since the indicator H is out of the defined range. In Comparative Examples Nos. 16 and 17, although the steel compositions are also in the defined ranges, the fatigue strengths are also low and 800 MPa or less since the indicators C are out of the defined range. Observation of the fractured specimens among samples subjected to the fatigue test for the starting points of fatigue fracture revealed inclusions composed mainly of $SiO_2$ in all specimens.

As is apparent from the above, the examples satisfying all conditions defined in the present invention are excellent in fatigue characteristics as compared with the Comparative Examples and Conventional Example.

TABLE 1

| Test No. | Classification | Chemical components (% by mass) | | | | | | | | | | | | | |
|---|---|---|---|---|---|---|---|---|---|---|---|---|---|---|---|
| | | C | Si | Mn | P | S | Cr | Al | N | Mo | V | Nb | Ca | Mg | Zr |
| 1 | Examples of | 0.52 | 3.09 | 1.25 | 0.004 | 0.004 | 1.77 | 0.003 | 0.0040 | | | | | | |
| 2 | the invention | 0.69 | 3.01 | 1.18 | 0.004 | 0.005 | 1.89 | 0.003 | 0.0049 | | | | | | |
| 3 | | 0.63 | 1.20 | 0.92 | 0.006 | 0.006 | 3.05 | 0.002 | 0.0040 | | | | | | |
| 4 | | 0.59 | 4.80 | 1.54 | 0.003 | 0.005 | 1.72 | 0.002 | 0.0032 | | | | 0.0031 | | |
| 5 | | 0.65 | 1.11 | 0.35 | 0.004 | 0.005 | 3.20 | 0.003 | 0.0047 | | | | | | |
| 6 | | 0.59 | 2.90 | 1.97 | 0.005 | 0.005 | 1.81 | 0.003 | 0.0040 | | | | | | |
| 7 | | 0.61 | 4.23 | 1.43 | 0.003 | 0.006 | 0.15 | 0.002 | 0.0043 | | | | | | |
| 8 | | 0.61 | 2.95 | 1.37 | 0.006 | 0.005 | 3.46 | 0.003 | 0.0032 | | | | 0.0024 | 0.001 | |
| 9 | | 0.61 | 2.89 | 1.15 | 0.005 | 0.005 | 1.77 | 0.003 | 0.0033 | 0.24 | 0.22 | | 0.0044 | | 0.0032 |
| 10 | | 0.60 | 2.86 | 1.11 | 0.003 | 0.003 | 1.84 | 0.002 | 0.0050 | | 0.25 | | 0.0013 | 0.0021 | 0.0029 |
| 11 | | 0.59 | 3.07 | 1.16 | 0.004 | 0.005 | 1.84 | 0.003 | 0.0049 | | | 0.08 | | 0.0045 | 0.0062 |
| 12 | Comparative | 0.60 | 2.84 | 1.36 | 0.005 | 0.005 | 4.08 | 0.002 | 0.0036 | | | | 0.0035 | | |
| 13 | Examples | 0.61 | 2.81 | 1.11 | 0.004 | 0.006 | 1.88 | 0.057 | 0.0044 | | | | | | |
| 14 | | 0.60 | 2.24 | 1.14 | 0.005 | 0.006 | 1.23 | 0.002 | 0.0040 | | | | | | 0.0047 |
| 15 | | 0.60 | 3.04 | 1.26 | 0.004 | 0.004 | 1.85 | 0.002 | 0.0045 | 0.15 | 0.05 | 0.07 | 0.001 | 0.0027 | 0.0014 |
| 16 | | 0.59 | 2.81 | 0.53 | 0.004 | 0.006 | 1.76 | 0.003 | 0.0039 | | | | | | |
| 17 | | 0.65 | 3.46 | 0.46 | 0.005 | 0.006 | 2.41 | 0.002 | 0.0036 | 0.21 | 0.29 | | | 0.0014 | 0.0037 |
| 18 | Conventional Example | 0.54 | 1.48 | 0.69 | 0.005 | 0.009 | 0.64 | 0.002 | 0.0032 | | | | | | |

TABLE 2

| Test No. | Classification | Indicator H | Indicator C | Solution treatment temperature (° C.) | Tempering hardness (HV) | Total decarburized depth (mm) | Fatigue strength (MPa) |
|---|---|---|---|---|---|---|---|
| 1 | Examples of | 165 | 2.48 | 950 | 615 | 0.01 | 862 |
| 2 | the invention | 171 | 2.55 | 950 | 627 | 0.01 | 872 |
| 3 | | 162 | 1.30 | 1025 | 579 | 0.03 | 808 |
| 4 | | 186 | 3.12 | 950 | 652 | 0.01 | 878 |
| 5 | | 161 | 3.17 | 1025 | 581 | 0.03 | 811 |
| 6 | | 171 | 1.47 | 950 | 634 | 0.01 | 867 |
| 7 | | 163 | 2.96 | 850 | 574 | 0 | 823 |
| 8 | | 187 | 2.16 | 1050 | 660 | 0.04 | 850 |
| 9 | | 178 | 2.52 | 1025 | 610 | 0.03 | 815 |
| 10 | | 174 | 2.58 | 1050 | 614 | 0.03 | 839 |
| 11 | | 168 | 2.64 | 950 | 611 | 0.01 | 853 |

TABLE 2-continued

| Test No. | Classification | Indicator H | Indicator C | Solution treatment temperature (° C.) | Tempering hardness (HV) | Total decarburized depth (mm) | Fatigue strength (MPa) |
|---|---|---|---|---|---|---|---|
| 12 | Comparative | 192 | 2.09 | 1150 | 679 | 0.09 | 744 |
| 13 | Examples | 166 | 2.53 | 950 | 609 | 0.01 | 692 |
| 14 | | 153 | 1.96 | 900 | 519 | 0.01 | 725 |
| 15 | | 169 | 2.41 | 1025 | 589 | 0.04 | 789 |
| 16 | | 161 | 5.30 | 950 | 587 | 0.01 | 651 |
| 17 | | 176 | 7.52 | 1050 | 649 | 0.04 | 696 |
| 18 | Conventional Example | 134 | 2.14 | 850 | 472 | 0 | 669 |

The invention claimed is:

1. A spring steel consisting of, in % by mass:
C: 0.50 to 0.70%,
Si: 3.01 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities,
wherein H defined by the following equation (a) is 175 or more, and C' defined by the following equation (b) is 3.25 or less:

$$H = 33.6[C] + 10.0[Si] + 5.95[Mn] + 11.1[Cr] + 90.0 \quad (a),$$

and $$C' = [Si]/[Mn] \quad (b),$$

where [C], [Si], [Mn], and [Cr] represent the content (% by mass) of each element in the steel.

2. A spring produced by subjecting a steel material to a heat treatment after wire drawing, wherein the steel material consists of, in % by mass:
C: 0.50 to 0.70%,
Si: 3.01 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%, and
N: 0.0020 to 0.0100%,
with the balance being Fe and inevitable impurities,
wherein the spring is a spring having H defined by the following equation (a) of 175 or more, and C' defined by the following equation (b) of 3.25 or less:

$$H = 33.6[C] + 10.0[Si] + 5.95[Mn] + 11.1[Cr] + 90.0 \quad (a),$$

and $$C' = [Si]/[Mn] \quad (b),$$

where [C], [Si], [Mn], and [Cr] represent the content (% by mass) of each element in the steel.

3. A spring steel consisting of, in % by mass:
C: 0.50 to 0.70%,
Si: 3.01 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%,
N: 0.0020 to 0.0100%, and one or more of:
Mo: 0.01 to 1.00%,
V: 0.01 to 0.30%,
Nb: 0.001 to 0.200%,
Ca: 0.0002 to 0.0100%,
Mg: 0.0002 to 0.0100%, and
Zr: 0.0005 to 0.1000%,
with the balance being Fe and inevitable impurities,
wherein H' defined by the following equation (c) is 178 or more, and C' defined by the following equation (b) is 3.25 or less:

$$H' = 33.6[C] + 10.0[Si] + 5.95[Mn] + 11.1[Cr] + 21.9[Mo] + 34.0[V] + 90.0 \quad (c),$$

and $$C' = [Si]/[Mn] \quad (b),$$

where [C], [Si], [Mn], [Cr], [Mo], and [V] represent the content (% by mass) of each element in the steel.

4. A spring produced by subjecting a steel material to a heat treatment after wire drawing, wherein the steel material consists of, in % by mass:
C: 0.50 to 0.70%,
Si: 3.01 to 5.00%,
Mn: 0.30 to 2.00%,
P: 0.0002 to 0.0500%,
S: 0.0002 to 0.0500%,
Cr: 0.10 to 3.50%,
Al: 0.0005 to 0.0500%,
N: 0.0020 to 0.0100%, and one or more of:
Mo: 0.01 to 1.00%,
V: 0.01 to 0.30%,
Nb: 0.001 to 0.200%,
Ca: 0.0002 to 0.0100%,
Mg: 0.0002 to 0.0100%, and
Zr: 0.0005 to 0.1000%,
with the balance being Fe and inevitable impurities,
wherein the spring is a spring having H' defined by the following equation (c) of 178 or more, and C' defined by the following equation (b) of 3.25 or less:

$$H' = 33.6[C] + 10.0[Si] + 5.95[Mn] + 11.1[Cr] + 21.9[Mo] + 34.0[V] + 90.0 \quad (c),$$

and $$C' = [Si]/[Mn] \quad (b),$$

where [C], [Si], [Mn], [Cr], [Mo], and [V] represent the content (% by mass) of each element in the steel.

* * * * *